(No Model.)
S. H. PERCY.
DRIVING WHEEL ADJUSTMENT.
No. 501,625. Patented July 18, 1893.
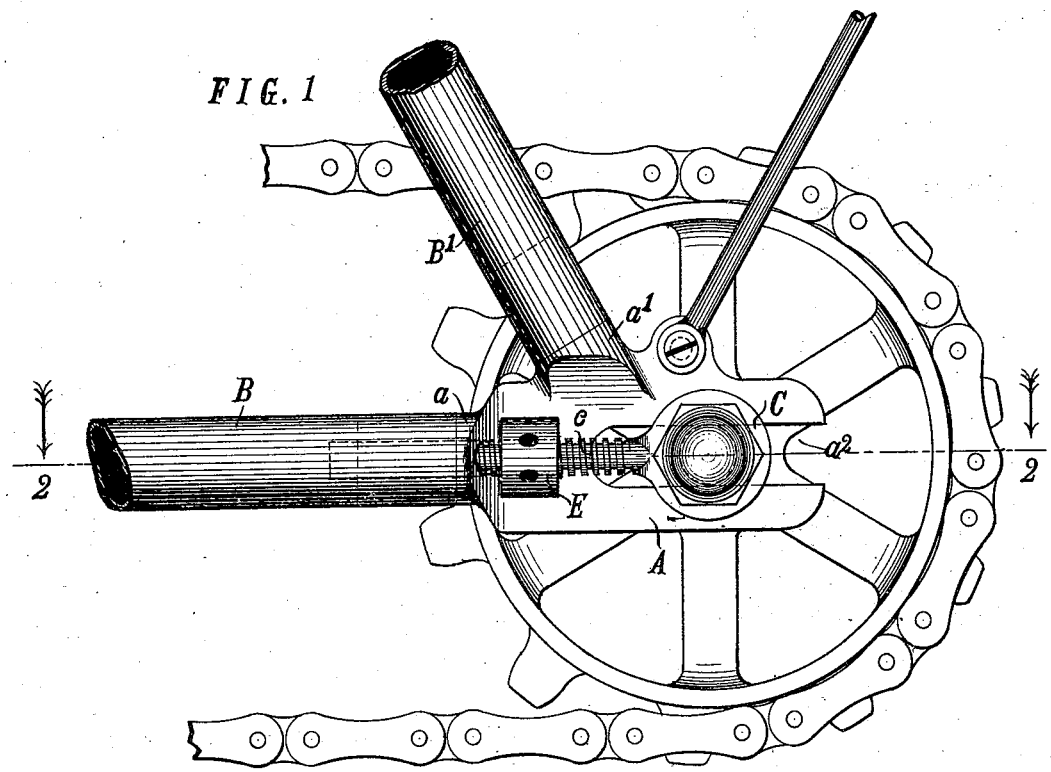
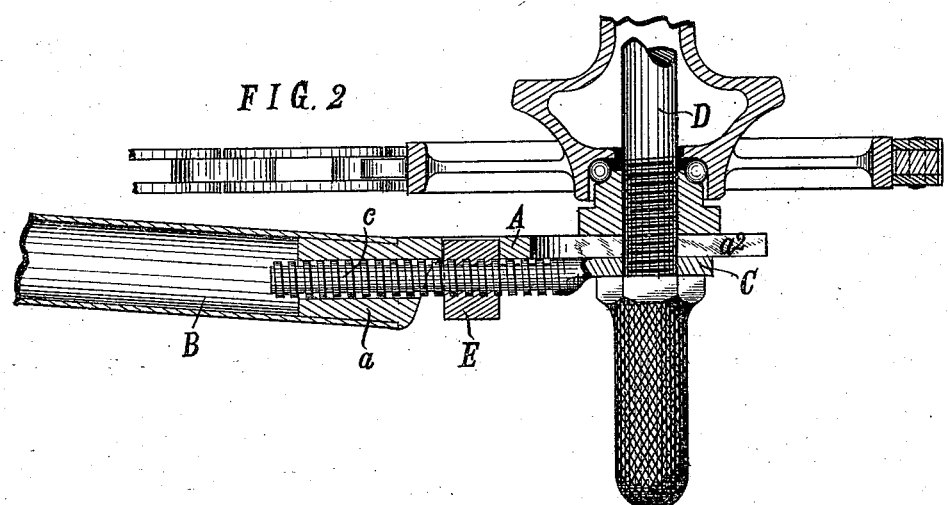
WITNESSES.
Frank Miller.
M. S. Ingham.
INVENTOR.
Sidney H. Percy
By Wing & Thurston
his Attorneys

UNITED STATES PATENT OFFICE.

SIDNEY H. PERCY, OF CHICAGO, ILLINOIS, ASSIGNOR TO THE SUNOL BICYCLE COMPANY, OF SAME PLACE.

DRIVING-WHEEL ADJUSTMENT.

SPECIFICATION forming part of Letters Patent No. 501,625, dated July 18, 1893.

Application filed December 6, 1892. Serial No. 454,241. (No model.)

*To all whom it may concern:*

Be it known that I, SIDNEY H. PERCY, a subject of the Queen of Great Britain, residing at Chicago, in the county of Cook and State of Illinois, have invented certain new and useful Improvements in Driving-Wheel Adjustments; and I do hereby declare the following to be a full, clear, and exact description of the invention, such as will enable others skilled in the art to which it appertains to make and use the same.

My invention relates to the class of devices with which the position of the rear or driving wheel may be adjusted, the object of such adjustment being primarily to regulate the tension of the driving chain.

The object of my invention is to provide a simple and inexpensive device by means of which the rear wheel axle may be positively moved any necessary distance either forward or backward, thereby tightening or loosening the chain as desired and moving the wheel into and holding it in proper alignment; and it consists in the construction and combination and parts hereinafter described and pointed out in the claim.

In the drawings, Figure 1 is a side elevation of the rear part of a safety bicycle frame and my improved adjusting device; and Fig. 2 is a sectional view of the same parts in the plane indicated by the line 2—2.

Referring to the parts by letter, B B' represent the two tubes which form the rear frame of a safety bicycle on one side of the rear wheel.

A represents a yoke having two arms $a$ $a'$ which enter and are secured to the ends of the tubes B B'. This yoke therefore connects the tubes B B' and forms itself a part of the bicycle frame. The yoke is provided with a guide slot $a^2$, and the rear axle lies and moves in the slot.

C represents a guide block which embraces the rear wheel axle D outside of the yoke A. It is provided with a screw threaded stem $c$ which extends forward through the hollow arm $a$ of the yoke whereby the threaded stem is protected from injury.

E represents a nut which is screwed onto the threaded stem $c$ and lies between and engages with the two shoulders or their equivalents on the frame.

In the construction shown, the yoke A is slotted and the ends of the slot form the two shoulders. The nut lies in said slot and its sides engage with the ends of the slot, which prevent endwise movement of the nut so that when the nut is revolved the guide block is moved in one direction or the other.

In order to provide means for turning the nut a number of holes may be made in its periphery, into which the end of an operating lever may be placed.

Mechanism like that above described lies on both sides of the rear wheel. Therefore each end of the axle may be independently adjusted. With the mechanism described it is evident that the wheel axle may be positively moved backward or forward and firmly held at whatever point it is placed. The chain can neither be loosened nor tightened, nor can either end of the axle be moved in either direction, except by turning the nut.

Having described my invention, I claim—

In a bicycle, the combination, of a yoke which connects the rear ends of the frame and forms a part thereof, said yoke having a guide slot and a hollow arm, and the rear wheel axle which extends through said slot, with a guide block which embraces the said axle, a threaded stem on said block which extends forward through the hollow arm of the yoke, a nut on said stem, and two shoulders on the yoke between which the nut lies, substantially as and for the purpose specified.

In testimony whereof I affix my signature in presence of two witnesses.

SIDNEY H. PERCY.

Witnesses:
E. L. THURSTON,
FRANK MILLER.